(12) United States Patent
Lindemann et al.

(10) Patent No.: US 6,780,349 B1
(45) Date of Patent: Aug. 24, 2004

(54) METHOD FOR PRODUCING CERAMIC GREEN BODIES

(75) Inventors: Gert Lindemann, Lichtenstein (DE); Imke Koengeter, Stuttgart (DE); Doris Peters, Stuttgart (DE); Ingrid Wuehrl, Gerlingen (DE); Ulrich Eisele, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,899

(22) PCT Filed: May 19, 2000

(86) PCT No.: PCT/DE00/01588

§ 371 (c)(1),
(2), (4) Date: Jun. 11, 2002

(87) PCT Pub. No.: WO00/73239

PCT Pub. Date: Dec. 7, 2000

(30) Foreign Application Priority Data

May 26, 1999 (DE) .......................... 199 24 134

(51) Int. Cl.$^7$ .............................. B28B 3/20; B29B 9/00
(52) U.S. Cl. .......................... 264/6; 264/211; 264/319; 264/638
(58) Field of Search ........................ 264/6, 211, 211.11, 264/319, 638

(56) References Cited

U.S. PATENT DOCUMENTS

| | | | |
|---|---|---|---|
| 4,150,078 A | * | 4/1979 | Miller et al. |
| 4,746,220 A | * | 5/1988 | Sukai et al. |
| 5,155,158 A | | 10/1992 | Kim |
| 5,368,667 A | * | 11/1994 | Minh et al. |
| 5,544,426 A | * | 8/1996 | Yoshida et al. |
| 5,700,548 A | * | 12/1997 | Warnier et al. |
| 5,707,584 A | * | 1/1998 | Terpstra et al. |
| 5,935,515 A | * | 8/1999 | Hesse et al. |
| 6,352,611 B1 | * | 3/2002 | Han et al. |
| 6,492,050 B1 | * | 12/2002 | Sammes |

FOREIGN PATENT DOCUMENTS

| | | | |
|---|---|---|---|
| EP | 0 441 219 | | 8/1991 |
| JP | 362041015 | * | 2/1987 |
| WO | 99/17390 | * | 4/1999 |

OTHER PUBLICATIONS

Abstract of JP 362041015, Feb. 1987.*

* cited by examiner

Primary Examiner—Christopher A. Fiorilla
(74) Attorney, Agent, or Firm—Kenyon & Kenyon

(57) ABSTRACT

A method of producing ceramic greenware, in particular a ceramic green film, having a ceramic powder component as the main ingredient and at least one organic solvent-free component as a secondary ingredient. To do so, the ceramic powder component is processed with the organic components initially to yield a highly viscous, solvent-free starting material which is then shaped by an extruder to form the greenware or green film.

13 Claims, No Drawings

METHOD FOR PRODUCING CERAMIC GREEN BODIES

This application is a 371 of PCT/DE00/01588 filed May 19, 2000.

FIELD OF THE INVENTION

The present invention relates to a method of producing ceramic greenware, in particular ceramic green films.

BACKGROUND INFORMATION

It is known that film castings may be used in the production of ceramic film substrates from $ZrO_2$. To do so, first a ceramic $ZrO_2$ powder is prepared together with organic components such as a binder, a plasticizer and a solvent to form a castable suspension. This suspension is then cast in the form of a film in a narrow viscosity range to guarantee a uniform thickness and quality of the substrate. Such a method is known from European Published Patent Application No. 0 441 219, for example.

For drying, i.e., removing solvent from the ceramic green film, the cast green film is then passed through a long drying channel which is equipped with a closed exhaust air system and is protected from the risk of explosion, and finally the green film is sent to individual printing steps to produce a sensor, for example. The green film is dried after casting essentially for the purpose of minimizing shrinkage in the subsequent process steps and removing at least some of the solvent.

In addition, with known green films, additional drying of the previously printed green film is usually necessary after each printing step to produce a sensor. In practice, however, it has been found that undesirable but unavoidable post-shrinkage of green films during such an intermediate drying depends greatly on the selected drying conditions.

Unwanted post-shrinkage is due essentially to residues of solvents or other organic components which remain in the green film and are at least partially volatile or undergo partial decomposition at temperatures above approx. 60° C.

Thus, known ceramic green films can no longer be recycled directly after drying without additional complicated processing steps because some of the organic plasticizer has been expelled in drying, for example.

SUMMARY OF THE INVENTION

The method according to the present invention for producing ceramic green films has the advantage in comparison with the related art that no solvents are used.

Thus, greenware or green films produced according to the present invention have little or no post-shrinkage, for example, which is very advantageous, in particular in the case of drying steps between individual printing steps, so the post-shrinkage problems encountered with cast greenware in the related art are overcome. The production process of ceramic green films is thus greatly improved with regard to consistent quality.

In addition, ceramic greenware or green films produced according to the present invention are not subject after extrusion, for example, to any shrinkage or deformation forces, which are unavoidable in drying castable suspensions. Therefore, their longitudinal and lateral dimensional stability is always guaranteed.

In addition, the surface structure of ceramic greenware or green films produced by the method according to the present invention is determined essentially by the shape of the extruder nozzle. Typical drying defects such as bubbles or development of a skin, which occur with cast films, do not occur here.

Due to the fact that no solvents are used in the method according to the present invention, it is also possible to eliminate a time-consuming and energy-intensive drying step after casting the green film or greenware known in the related art in a very advantageous manner. At the same time, this also makes it possible to eliminate expensive explosion-protected installation parts and facilities for recovery of solvents. This yields considerable advantages with regard to the cost of the production installations for the films and their complexity.

Finally, the ceramic green film according to the present invention is sufficiently flexible for the printing process in an advantageous manner.

It is very advantageous to add a dispersant to the ceramic greenware or green films during the production process, so that the highly viscous starting material will always remain fully recyclable without any additional processing steps. Thus, since the composition always remains unchanged during and/or after production of the ceramic greenware, residues, in particular film residues obtained after a kneading or extrusion process, can be added back to the highly viscous starting material (after suitably pulverizing) and processed together with it in a very advantageous manner. This saves on raw materials while preventing waste.

It is also advantageous if the extruder is heated so that the viscosity of the highly viscous starting material is reduced in the shaping of the ceramic green film and can be adjusted in a controlled manner. It is very advantageous that the highly viscous starting material used here behaves like a thermoplastic.

It is also advantageous if the ceramic greenware is picked up by a suitable delivery device after leaving the extruder and is cooled in the process. The ceramic green film produced can thus, for example, be sent immediately to further processing steps, e.g., a printing process in sensor production.

To monitor the thickness of the green film thus produced, it is also advantageous if the calender used is provided with an integrated device for measuring the thickness of the green film, which device is connected to the extruder by a control device in an especially advantageous manner and thus always guarantees a largely constant preset film thickness.

DETAILED DESCRIPTION

In a first embodiment, first 80 wt % to 90 wt % $ZrO_2$ powder having a typical particle size of 0.1 μm to 1 μm as the ceramic powder component and the main ingredient of a ceramic green film to be produced, together with 0.5 wt % to 3 wt % of a sintering additive, 5 wt % to 10 wt % of the organic binder polyvinylbutyral and 1 wt % to 7 wt % of the organic plasticizer dibutyl sebacate as secondary ingredients are used. In particular, a mixture of $SiO_2$ and $Al_2O_3$ or related materials, which are known per se, containing silicon and aluminum is suitable as a sintering additive. Instead of $ZrO_2$ powder, $ZrO_2$ powder stabilized with yttrium in a known manner or $Al_2O_3$ powder is also suitable for use here.

Preferably 86.3 wt % yttrium-stabilized $ZrO_2$ powder is used together with 1.5 wt % of a sintering additive of $SiO_2$ and $Al_2O_3$, 7 wt % polyvinylbutyral and 5.2 wt % dibutyl sebacate. These materials are first added to a continuous kneader, where they are processed to yield a highly viscous starting material. A highly viscous starting material as mentioned herein is understood to be a material having a typical and conventional viscosity in molding methods for thermoplastics at 150° C. In concrete terms, the viscosity of the starting material depending on shear rate is preferably approx. 2000 Pa·s$^{-s}$ at a shear rate of approx. 100 s$^{-1}$ to approx. 20,000 Pa·s$^{-1}$ at a shear rate of 10 s$^{-1}$.

Granules with a narrow size distribution are produced from this highly viscous ceramic starting material by strand granulation in an essentially known manner, followed by extrusion. Typical values for the granule size include a diameter of approx. 5 mm and a length of 2 mm to 3 mm.

The highly viscous starting material which is sent for extrusion is thus solvent-free and behaves like a thermoplastic when heated.

To extrude the starting material an extruder having a 3-zone screw having a compression zone, a shearing zone and a mixing zone at the tip of the screw, for example, is used. This extruder is heated to a temperature of 130° C. to 150° C. to lower the viscosity of the ceramic starting material. To do so, the organic components of the ceramic starting material have thermal stability up to at least 130° C., preferably up to at least 150° C., i.e., they are not volatile and up to this temperature do not decompose, so that the highly viscous starting material behaves like a thermoplastic when heated.

The extruder also has a flat sheet nozzle with a fishtail-like or coat hanger-like mass distribution channel to produce a ceramic green film. The nozzle has a flexible lip for this purpose, allowing an accurate adjustment of the thickness of the ceramic green film leaving the extruder. The flat sheet nozzle having the flexible lip is preferably heated to 150° C. to 170° C.

The ceramic green film leaving the flat sheet nozzle of the extruder is then drawn off further with a calender and cooled to a temperature between 150° C. and room temperature, the degree of drawing in draw-off being selected to be as low as possible.

After cooling and cutting the ceramic green film produced in this way, it can be used in the known manner in sensor production and can be printed in individual printing steps, each followed by drying steps, for example.

In a modification of the first embodiment, a second embodiment of the present invention provides for 86.0 wt % yttrium-stabilized ZrO$_2$ powder to be used together with 1.4 wt % of a sintering additive of SiO$_2$ and Al$_2$O$_3$, 8.7 wt % polyvinylbutyral, 2.5 wt % dibutyl sebacate and also 1.4 wt % dispersant. The dispersant is, for example, a conventional oligomeric polyester. Again, the starting substances are sent first to a continuous kneading apparatus so that a highly viscous ceramic starting material is prepared from them. This ceramic starting material is then processed further to form granules by strand granulation in a method completely identical to that used in the first embodiment and extruded by the extruder described above.

Therefore, the ceramic green film ultimately leaving the flat sheet nozzle of the extruder is again drawn off by using a calender and cooled to a temperature of 150° C. to room temperature, where the degree of drawing is as low as possible.

After cooling and cutting the ceramic green film produced in this way, it is processed further directly by printing. No prior drying of the ceramic green film or removal of solvent is performed.

An essentially known device for continuous measurement of film thickness is also integrated into the calender to monitor the thickness of the drawn-off green film product. This device for measuring film thickness is also preferably connected to the extruder via a control device so that a largely constant preset film thickness of the green film can be guaranteed by way of this controller.

What is claimed is:

1. A method of producing a ceramic greenware, comprising the steps of:

providing a ceramic powder component as a main ingredient;

providing at least one organic solvent-free component as a secondary ingredient;

processing the ceramic powder component and the at least one organic solvent-free component to yield a highly viscous starting material;

causing an extruder to shape the ceramic powder component and the at least one organic solvent-free component in order to form the ceramic greenware; and granulating the highly viscous starting material before extrusion;

wherein the step of granulating is performed according to a strand granulation process that is downstream from a kneading apparatus.

2. The method according to claim 1, wherein:

the ceramic greenware includes a ceramic green film.

3. The method according to claim 2, further comprising the step of:

causing a calender to draw off the ceramic green film leaving the extruder.

4. The method according to claim 3, further comprising the step of:

measuring a thickness of the ceramic green film in the calender.

5. The method according to claim 1, wherein:

the highly viscous starting material includes a thermoplastic solvent-free starting material.

6. The method according to claim 1, wherein:

the at least one organic solvent-free component includes at least one of an organic plasticizer and an organic binder.

7. The method according to claim 6, wherein:

the ceramic powder component includes one of ZrO$_2$ powder and yttrium-stabilized ZrO$_2$ powder, the organic binder includes polyvinylbutyral, and the organic plasticizer includes dibutyl sebacate.

8. The method according to claim 1, further comprising the step of:

adding at least one of a sintering additive and a dispersant to the highly viscous starting material.

9. The method according to claim 1, further comprising the step of:

processing the ceramic powder component and the at least one organic solvent-free component in a kneading apparatus to yield the highly viscous starting material.

10. The method according to claim 1, further comprising the step of:

heating the extruder to a temperature ranging from 130° C. to 150° C.

11. The method according to claim 1, wherein:

the extruder includes a 3-zone screw that includes a compression zone, a shearing zone, and a mixing zone.

12. The method according to claim 1, wherein:
the outlet of the extruder includes a mass distribution channel in the form of one of a fishtail and a clothes-hanger.

13. A method of producing a ceramic greenware, comprising the steps of:
providing a ceramic powder component as a main ingredient;
providing at least one organic solvent-free component as a secondary ingredient;
processing the ceramic powder component and the at least one organic solvent-free component to yield a highly viscous starting material; and
causing an extruder to shape the ceramic powder component and the at least one organic solvent-free component in order to form the ceramic greenware;
wherein:
the outlet of the extruder includes a mass distribution channel in the form of one of a fishtail and a clothes-hanger; and
the outlet of the extruder is provided with a lip that is heated to adjust a thickness of the ceramic greenware.

* * * * *